(12) United States Patent
Nashner et al.

(10) Patent No.: US 9,132,510 B2
(45) Date of Patent: Sep. 15, 2015

(54) MULTI-STEP PATTERN FORMATION

(75) Inventors: Michael S. Nashner, San Jose, CA (US); Peter N. Russell-Clarke, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 145 days.

(21) Appl. No.: 13/462,546

(22) Filed: May 2, 2012

(65) Prior Publication Data
US 2013/0291367 A1 Nov. 7, 2013

(51) Int. Cl.
| | |
|---|---|
| *B23K 26/38* | (2014.01) |
| *B23K 26/06* | (2014.01) |
| *B44C 1/22* | (2006.01) |
| *B23K 26/08* | (2014.01) |
| *B23K 26/36* | (2014.01) |
| *B23K 26/40* | (2014.01) |

(52) U.S. Cl.
CPC .............. *B23K 26/38* (2013.01); *B23K 26/063* (2013.01); *B23K 26/0807* (2013.01); *B23K 26/365* (2013.01); *B23K 26/4005* (2013.01); *B23K 26/4065* (2013.01); *B44C 1/228* (2013.01); *B23K 2201/18* (2013.01); *Y10T 29/49986* (2015.01); *Y10T 29/49996* (2015.01)

(58) Field of Classification Search
USPC .................................................. 29/527.4, 530
See application file for complete search history.

(56) References Cited

U.S. PATENT DOCUMENTS

| | | |
|---|---|---|
| 2,859,510 A | 11/1958 | Baxa |
| 5,028,075 A | 7/1991 | Donnelly |
| 5,280,819 A | 1/1994 | Newkirk et al. |
| 5,843,117 A | 12/1998 | Alt et al. |
| 6,149,506 A | 11/2000 | Duescher |
| 6,183,347 B1 | 2/2001 | Shaw |
| 6,453,783 B2 | 9/2002 | Yu et al. |
| 6,464,080 B1 | 10/2002 | Morris et al. |
| 6,517,995 B1 | 2/2003 | Jacobson et al. |
| 7,122,057 B2 | 10/2006 | Beam et al. |
| 7,540,697 B2 | 6/2009 | Wang et al. |
| 7,597,483 B2 | 10/2009 | Simmons et al. |
| 7,685,676 B2 | 3/2010 | McClellan |
| 8,015,852 B2 | 9/2011 | Su |
| 8,052,743 B2 | 11/2011 | Weber et al. |
| 8,066,251 B2 | 11/2011 | Brown |
| 8,295,902 B2 | 10/2012 | Salahieh et al. |
| 8,439,947 B2 | 5/2013 | Howard et al. |

(Continued)

FOREIGN PATENT DOCUMENTS

| | | |
|---|---|---|
| JP | 60244493 | 12/1985 |
| WO | WO03/002289 | 1/2003 |
| WO | WO2012/007755 | 1/2012 |

OTHER PUBLICATIONS

"Stew-Mac Inlay Tools and Materials.pdf", Stewart-Macdonald, http://web.archive.org/...op/Inlay,_pearl/Tools_and_supplies_for:_Inlay,_pearl_cutting/Carbide_Downcut_Inlay_Router_Bits.html, accessed Dec. 4, 2013.*

(Continued)

*Primary Examiner* — Alexander P Taousakis
(74) *Attorney, Agent, or Firm* — Brownstein Hyatt Farber Schreck, LLP

(57) ABSTRACT

One embodiment includes a method for creating a recessed pattern in a substrate. The method includes laser ablating the substrate to form a recessed complex edge geometry in the substrate. The recessed complex edge geometry forms at least a portion of the pattern. The method also includes machining a remainder of the pattern with a mechanical cutter.

20 Claims, 8 Drawing Sheets

(56) References Cited

U.S. PATENT DOCUMENTS

| | | |
|---|---|---|
| 8,454,705 B2 | 6/2013 | Pressacco et al. |
| 8,568,551 B2 | 10/2013 | Brennan et al. |
| 8,601,849 B2 | 12/2013 | Luo et al. |
| 2005/0064345 A1 | 3/2005 | Oyake |
| 2006/0008616 A1 | 1/2006 | Dean et al. |
| 2006/0097127 A1 | 5/2006 | Firth |
| 2007/0039691 A1* | 2/2007 | Mroz ............................ 156/293 |
| 2008/0206509 A1* | 8/2008 | Kent et al. ...................... 428/67 |
| 2008/0257006 A1 | 10/2008 | Durney et al. |
| 2008/0312727 A1 | 12/2008 | Blank |
| 2009/0014118 A1* | 1/2009 | Ratcliffe ...................... 156/265 |
| 2009/0043228 A1 | 2/2009 | Northrop et al. |
| 2009/0081403 A1* | 3/2009 | Trejo-Rincon ................. 428/67 |
| 2009/0305003 A1* | 12/2009 | Nagashima ................ 428/195.1 |
| 2011/0041553 A1* | 2/2011 | Xiong et al. ................... 63/1.12 |
| 2011/0156361 A1 | 6/2011 | Ghalambor et al. |
| 2011/0267773 A1 | 11/2011 | MacFarlane |
| 2013/0216740 A1 | 8/2013 | Russell-Clarke et al. |
| 2013/0251934 A1* | 9/2013 | Caracciolo et al. ............. 428/67 |
| 2014/0082926 A1 | 3/2014 | Tam et al. |
| 2014/0102162 A1 | 4/2014 | Morgenstern et al. |

OTHER PUBLICATIONS

Sean J. Barry, "Pearl Inlay Part III", http://inlay.com/inlay/pearl/pearl-3.html, accessed Jul. 2, 2014.*

Author Unknown, "Laboratory Instruments," http://www.mocon.com, 2 pages, at least as early as Oct. 12, 2012.

* cited by examiner

MULTI-STEP PATTERN FORMATION

TECHNICAL FIELD

The present invention relates generally to a multi-step pattern formation and, more specifically, to using laser ablation to form at least a portion of the pattern.

BACKGROUND

Many modern electronic devices are both functional and aesthetically appealing. For example, smart phones, tablet computers, notebook computers and desktop computers may not only provide users with desired functions, such as Internet access, video chatting, word processing and so forth, but may be presented in an artistic housing. Generally, fine details may help differentiate a higher end device, and one for which consumers are willing to pay more money for, from a run-of-the-mill device.

The details may include, for example, the fit and finish of exposed parts and/or graphic designs or features. In some cases, these graphic features may include intricate designs or logos. In some cases, these designs or logos are simply printed on the housings. However, in other cases, the designs or logos may be physical inserts within the surfaces of the housings. These types of features typically require multiple steps to create and, if they are intricate or have complex geometric shapes, are difficult to achieve through conventional machining techniques. In particular, if a feature has narrow edge geometry, such as with a sharp corner or point, traditional machining techniques are limited by the diameter of the cutting tool, thereby limiting the sharpness of the features.

SUMMARY

One embodiment includes a method for creating a recessed pattern in a substrate. The method includes laser ablating the substrate to form recessed complex edge geometry in the substrate. The recessed complex edge geometry forms at least a portion of the pattern. The method also includes machining a remainder of the pattern with a mechanical cutter to form the recessed pattern. The recessed pattern may then be filled with an inlay material. The inlay may be polished before a protective overcoat is applied. It should be appreciated that the application of a protective overcoat is optional.

Another embodiment may take the form of a method of manufacturing a device housing. The method of manufacturing includes obtaining a housing surface and laser ablating a moat in the housing surface. The moat defines a boundary of a pattern in the housing surface having complex edge geometry. The method of manufacturing further includes removing a portion of the housing surface located within the moat using a mechanical cutter to create a recessed portion in the housing surface in the shape of the pattern. The recessed pattern may then be filled with an inlay material. The inlay may be polished before an optional protective overcoat is applied.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Embodiments may generally take the form of methods for efficiently creating patterns in materials. The patterns may have a complex geometry including smooth curves and acute angles, for example. In some embodiments, the acute angles may be cut by a laser while all other portions of the patterns are cut by a mechanical cutter. In another embodiment, a laser may cut an outline of the pattern and a mechanical cutter used to remove material within the outline. These techniques take advantage of the precise cutting ability of lasers and the speed of mechanical cutters.

Figure 1:
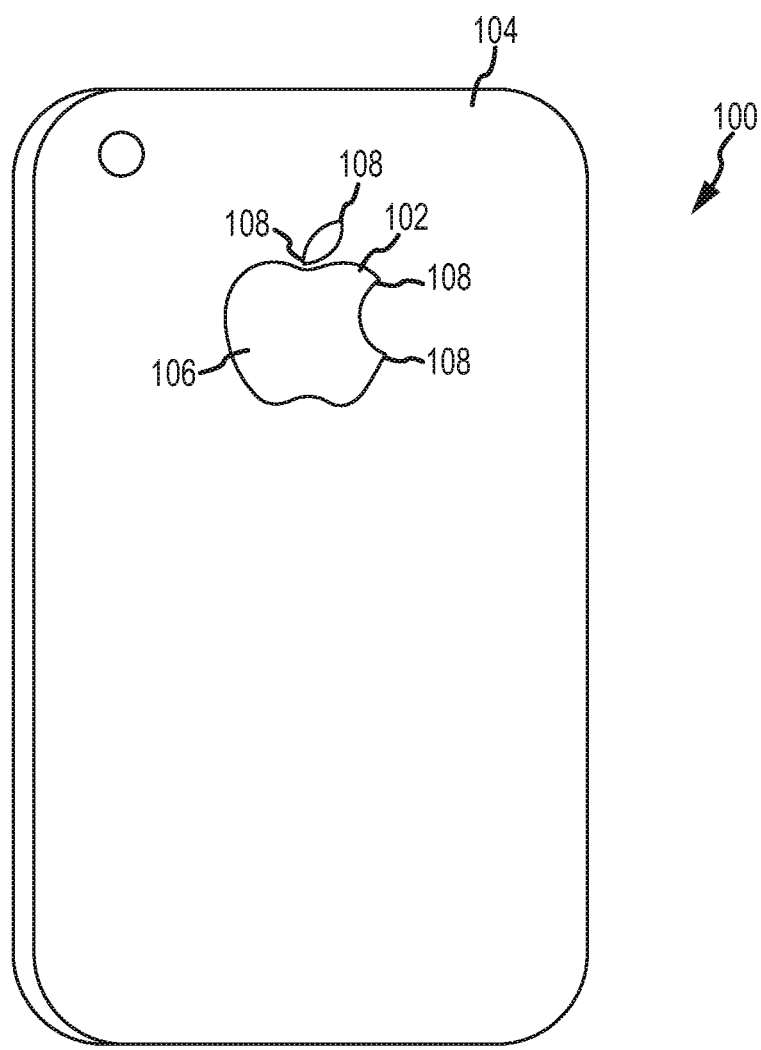
FIG. 1 illustrates an electronic device housing having a pattern with a complex geometry.

Referring to the drawings and turning initially to FIG. 1, an electronic device 100 is illustrated. In particular, FIG. 1 shows a rear view of the electronic device 100 to illustrate an intricate pattern 102 in the housing 104 of the electronic device. The housing 104 may be made of one or more suitable materials such as glass, metal, plastic, carbon fiber, and so forth. The illustrated electronic device 100 is a smart phone device. However, it should be appreciated that intricate patterns may be created in housings of various other electronic device types. As such, it should be appreciated that the present techniques may be applicable to the manufacture of housings for electronic devices other than smart phones such as desktop computers, notebook computers, tablet computers, digital video recorders, media players, televisions, and so forth.

The intricate pattern 102 may take the form of a recessed pattern in the housing 104 that is filled with inlay material 106. The inlay material may be any suitable material such as metal, glass, plastic and so forth. The pattern 102 may be a logo, a trademark, a symbol or other suitable pattern. As shown, the pattern 102 includes multiple acute angles or points 108. Generally, milling or machine cutters are limited by the size of their cutting tools as to how sharp an angle they may make in an interior cut. As used herein, an interior cut may generally refer to a cut where material is removed within an acute angle (e.g., interior to the angle). A cut made by a machine cutter generally yields, at its sharpest point, a curve matching the arc segment of the circumference of the cutting tool. Hence, the cut made by a machine cutter is limited as to how sharp of an interior cut or point may be made by the curvature of the circumference of the cutting tool. Generally, the cutting tool is not able to achieve a small enough radius cut to appear as a sharp interior point.

Figure 2:
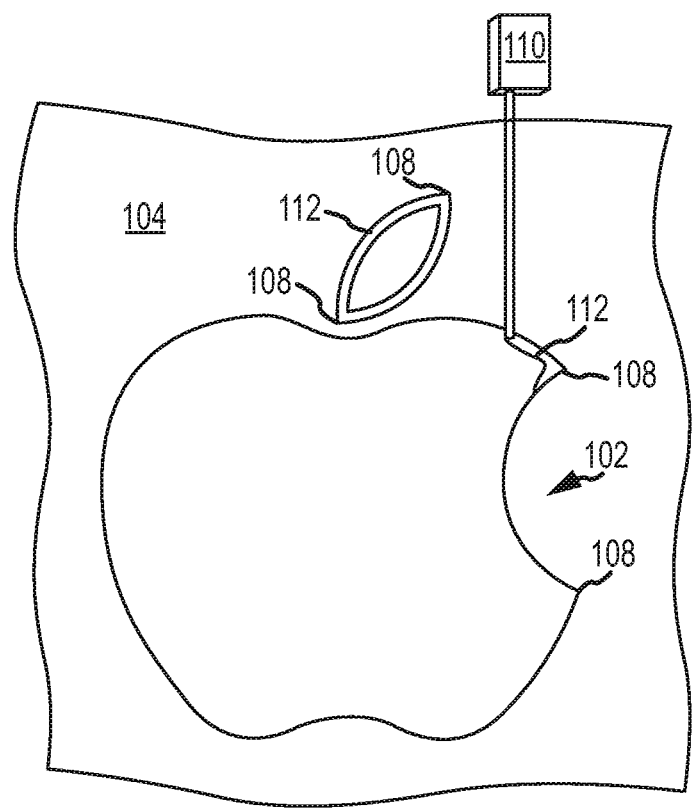
FIG. 2 is an expanded view of the pattern of FIG. 1 showing a laser ablating a portion of the housing to define the pattern.

FIG. 2 is a zoomed in view of the pattern 102 of FIG. 1 showing a laser 110 tracing a portion of the contour of the pattern 102. The laser 110 ablates the material of the housing 104 to leave an aperture 112 in the housing. The wavelength and power level of the laser 110 may vary based on the material of the housing so as to facilitate a relatively quick laser ablation process. In some embodiments, the laser may operate at wavelengths of approximately 50 micrometers or less. Additionally, the laser 110 or the housing 104 is moved at a pace that allows for a desired depth of ablation without completely penetrating through the housing to form a moat in the housing in the shape of the pattern 102. For example, the laser 110 may be moved at a rate that ablates the material to a certain depth, but does not penetrate the material. In some embodiments, a trench or moat is formed in the shape of the pattern by the laser.

Figure 3:
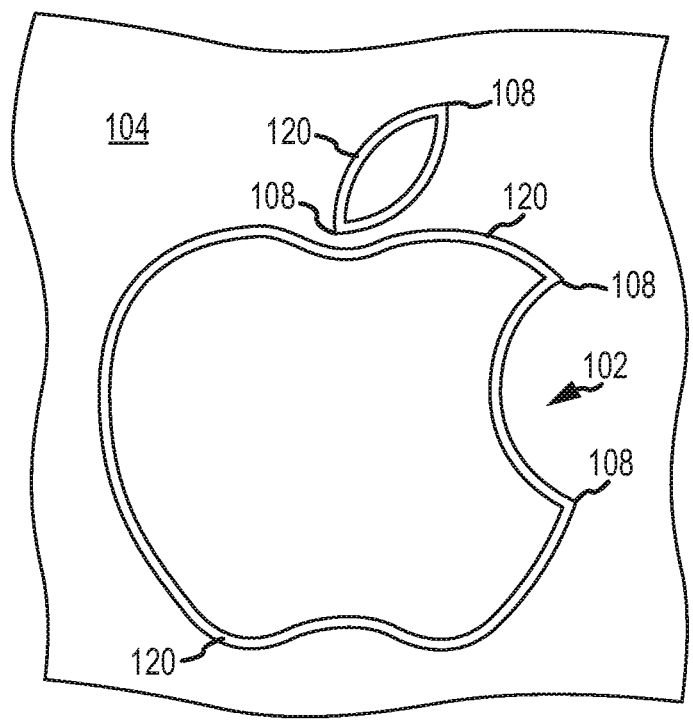
FIG. 3 illustrates a moat formed in the housing through laser ablation with the moat defining the pattern.

The laser 110 is able to form an acute interior cut that produces sharp points as well as providing narrow trenches or moats as part of the pattern or as part of the process of forming the pattern. Generally, the sharpness of the point or acute interior cut may be limited by one or more of the following: the wavelength of the laser beam, the spot size of the laser beam and/or the material that is being ablated. FIG. 3 illustrates a moat 120 outlining the pattern 102. As used herein, a moat may refer to a trench that follows the outline of the pattern. Once the moat 120 has been created, a machining or milling process may be performed to remove the material bounded by the moat 120. That is, the moat 120 may serve as a boundary for the machining process. Generally, the moat 120 may have dimensions achievable by the laser and suitable for the requirements of the pattern. In some embodiments, the moat 120 may have a width between approximately 0.10 to 1.00 mm and a depth between approximately 0.05 and 0.50 mm. In one embodiment, the laser may have a spot diameter of between 20 and 40 microns (e.g., approximately 30 microns). In order to create a moat larger than the spot diameter, a raster or spiral pattern may be implemented to ablate material to achieve desired dimensions.

Figure 4:
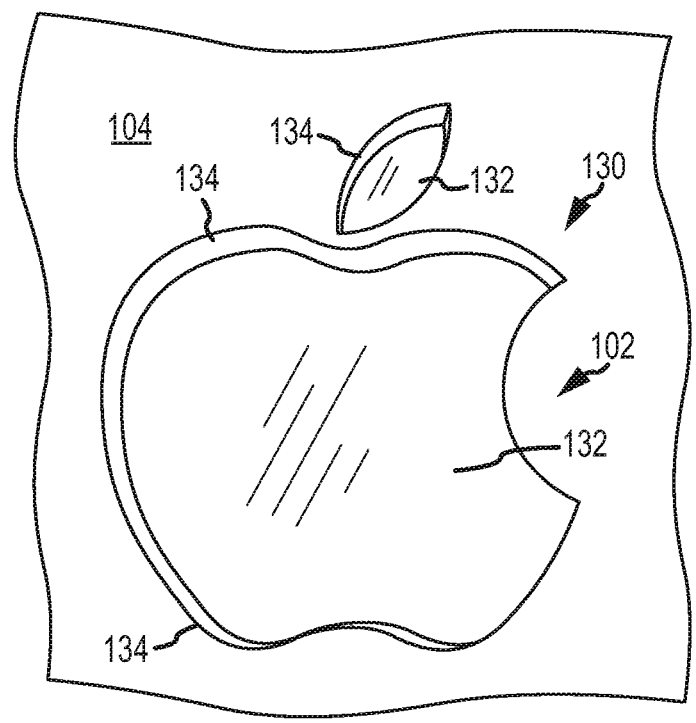
FIG. 4 illustrates a recessed pattern after mechanical removal of material bound by the moat of FIG. 3.

FIG. 4 illustrates a recessed pattern 130 after removal of the material bounded by the moat. Generally, it may be desirable to have a level bottom surface 132 in the recessed pattern. That is, some embodiments may lack a lip or edge distinguishing laser ablated cuts from machine cuts in a material. Hence, the laser ablation and the milling or machining processes may remove the material of the housing to a uniform depth. As such, the recessed pattern 130 may have a generally planar bottom surface 132. Additionally, the recessed pattern 130 may have a vertical sidewall 134 or sidewalls. That is, in some embodiments, the sidewalls 134 of the recessed pattern may be generally orthogonal to the planar bottom surface 132.

In some embodiments, however, the sidewalls may not be vertical. Rather, the sidewalls may be tapered. The tapering of the sidewalls may be deliberately formed by the operation of the laser. That is, the laser 110 may be pulsed in a manner that correlates with a back-and-forth motion as it moves about the contour of the pattern 102. A first pass of the laser may ablate a first volume of material in a plane while a second pass of the laser may ablate less material to taper the sidewalls. In other embodiments, the laser ablation of the housing 104 may result in a natural tapering of the sidewalls. As laser cuts can often be angled or leave angled sidewalls, some embodiments may employ machine cuts for all but the sharp angles to provide flattened sidewalls.

Figure 5:
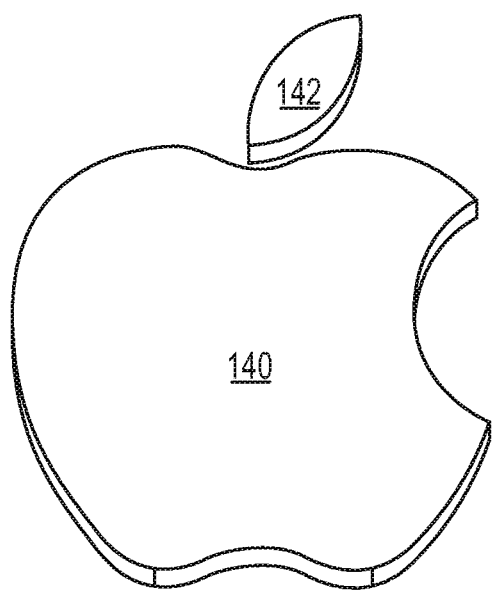
FIG. 5 illustrates insert members for insertion into the recessed pattern of FIG. 4.

FIG. 5 illustrates insert members 140, 142 that may be inserted, placed or fitted into the recessed pattern 130 shown in FIG. 4. In some embodiments, the insert members 140, 142 may have a shape and form designed to fit within the recessed pattern 130. As such, the shape of the insert members generally matches the shape(s) of the recessed pattern. The insert members may be adhered within the recessed pattern using an adhesive. In other embodiments, liquid material may fill the recessed pattern 130 where it solidifies in the form of the pattern. In some embodiments, the insert material may be melted or partially melted to the point where it is sufficiently malleable to take the form of the recessed pattern. Once in the recessed pattern, the insert material is cooled and hardens. In such embodiments, the pattern may be provided with one or more notches or lips to help secure the inserts within the recessed pattern.

Figure 6:
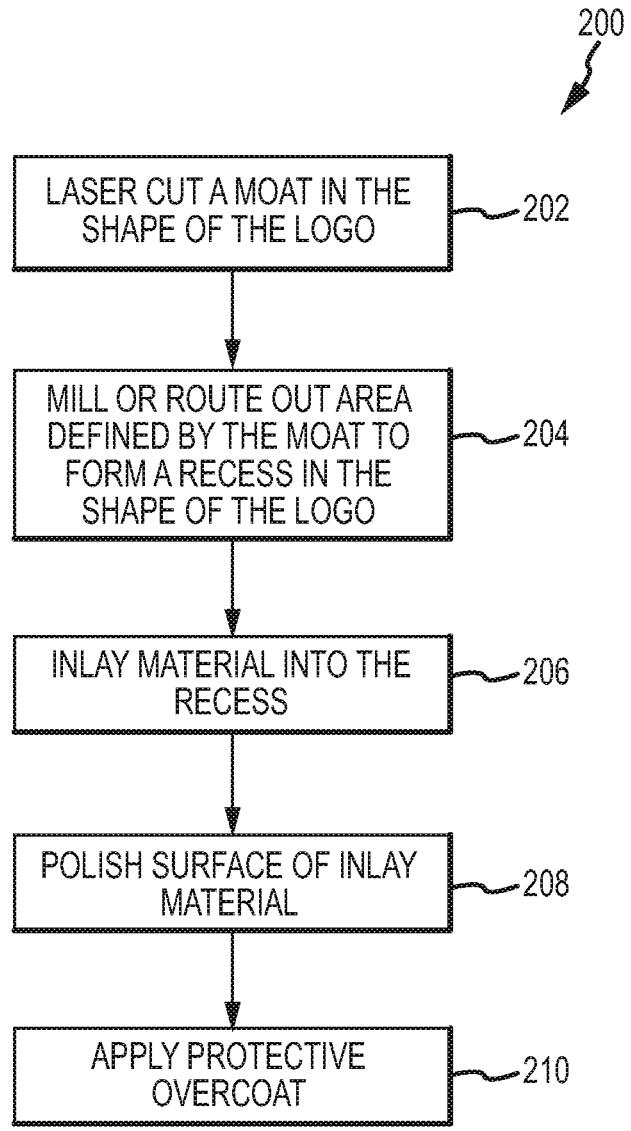
FIG. 6 is a flowchart illustrating a method of creating a complex geometric pattern in an electronic device housing in accordance with an example embodiment.

FIG. 6 is a flow chart illustrating a method 200 of creating a geometric pattern in an electronic device housing. Initially, laser ablation removes housing material in the shape of the pattern (Block 202). Generally, the laser ablation forms an aperture or moat in the housing having an exterior edge that defines the shape of the pattern. Once the pattern has been defined through the laser ablation step, a machining process may remove material bound by the moat (Block 204). Generally, the machining process removes material at a higher rate than laser ablation; however, it may be unable to achieve intricate details of the pattern with sufficient precision. As such, the laser ablation step may take advantage of the precision achievable by the laser while the machining step may take advantage of the high speed of material removal.

After the laser ablation and machining steps, the housing has a recessed pattern. The recessed pattern is filled with inlay material (Block 206). The inlay material may have a different color, texture, sheen, opacity, polish and so forth from the housing material. In some embodiments, the inlay material may be of a different material from the housing material. For example, the inlay material may be ceramic, plastic, or metal, while the housing material may be plastic, glass or carbon fiber. In some embodiments, the inlay material may be cut and/or shaped using a laser, while in other embodiments the inlay material may be cut using a machine cutter or both a machine cutter and a laser. For example, a computer numerical code (CNC) machine may cut the inlay material. In still other embodiments, the inlay material may be formed through a printing process, such as a 3-D printing process. The inlay material may be adhered or otherwise secured within the recessed pattern. In still other embodiments, the inlay material may be in a liquid or malleable state so that it conforms to the shape of the recessed pattern once it is inserted therein.

The inlay material may be polished (Block 208). In one embodiment, the inlay material is polished after being positioned within the recessed pattern. This step may help to ensure that the inlay material is flush with the housing. Additionally, the housing may be polished concurrently with the inlay material. In other embodiments, the inlay material is polished prior to being inserted into the recessed pattern.

After the inlay material is positioned in the recessed pattern, an optional overcoat may be applied (Block 210). The optional overcoat may be a clear plastic coating that may provide protection to the housing and the inlay material. The optional overcoat may be applied in any suitable manner such as by spraying, brushing or other suitable process. Additionally, in some embodiments, the optional overcoat may help to secure the inlay material within the recessed pattern. It should be appreciated that the overcoat may not be applied in an actual implementation of the method.

Figure 7:
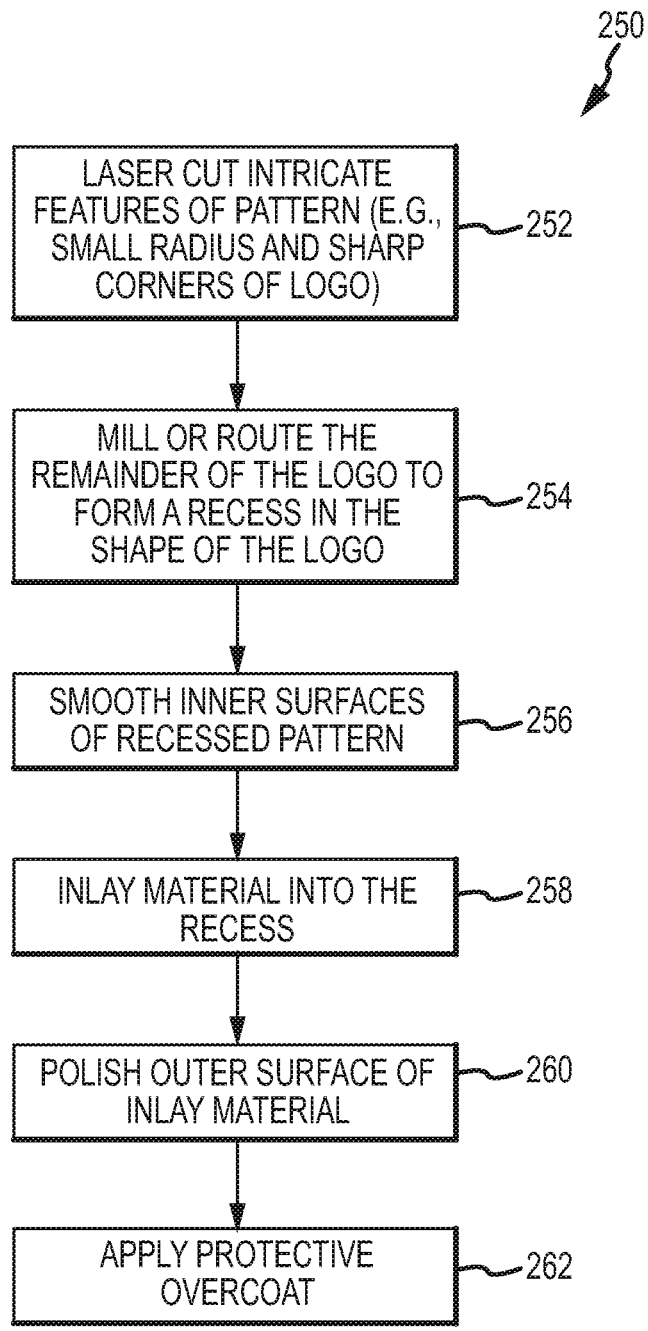
FIG. 7 is a flow chart illustrating a method of creating a complex geometric pattern in an electronic device housing in accordance with an alternative example embodiment.

Turning to FIG. 7, a flowchart illustrating an alternative method 250 for creating intricate features and/or complex geometries in a substrate is illustrated. The method may begin with a laser cutting intricate features into the substrate (Block 252). For example, the laser may cut the substrate to form points as part of a pattern and nowhere else. As such, only the intricate features are cut with the laser. A different cutting tool, such as a milling bit or other similar device may be used to remove substrate material to complete the pattern (Block 254). In some embodiments, an inner surface of the pattern maybe smoothed (Block 256), for example through an iterative process that produces increasingly finer finishes.

Once the recessed pattern is formed, an inlay material may be positioned within the recessed pattern (Block 258). In some embodiments the inlay material may be the same as the substrate material, but may have a different colorization, transparency, opacity, and/or texture. In other embodiments, the inlay material may be a different material than the substrate.

In still other embodiments, more than one material may be used as the inlay material. For example, a first inlay material may be positioned into the recessed pattern and subsequently a second inlay material may be positioned in the recessed pattern over the first inlay material. The first material may be opaque and the second material may be transparent. As such, the recessed pattern may be filled with layers of inlay material. In other embodiments, the certain areas of the recessed pattern may be filled with the first inlay material and other areas filled with the second inlay material. It should be appreciated that when different inlay materials are utilized, the first inlay material may be cured or hardened before inserting the second inlay material into the recessed pattern. Additionally, the different materials may require different curing, and/or solidifying times.

Once the inlay material is positioned within the recessed pattern, a smoothing and/or polishing step may be performed (Block 260). An overcoat may optionally be provided to cover and protect the inlay material and the intricate pattern (Block 262). The overcoat may generally be translucent or clear. The overcoat may help to secure the inlay material. Additionally, a glue or adhesive may be utilized to secure the inlay material in the recessed pattern. In some embodiments, the overcoat may not be applied.

Figure 8:
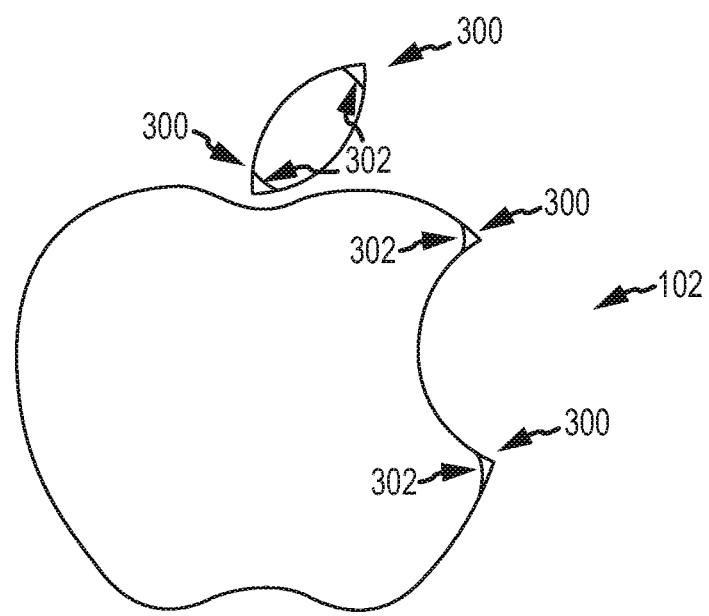
FIG. 8 illustrates laser ablation of only areas of having acute angles in accordance with an alternative embodiment.

FIG. 8 illustrates an initial laser ablation of intricate features 300 of the pattern 102. More particularly, the laser ablation has removed portions of the pattern 300 that conventional milling tools are unable to form with as much precision. In this case, the sharp interior corners of the pattern 102 have been ablated by the laser. The portion not ablated by the laser is a smoother curve 302 that may be removed by a convention milling tool. As such, the laser ablation process removes material in portions of the pattern 102 that has a sharp radius that may only be roughly approximated by conventional tools. However, as the laser ablation process is generally slower, the extent of material removed by the laser is limited to an amount that enables the conventional tool to remove the remainder of material for the pattern without negatively impacting the intricate portions of the pattern. As such, the curved portions 302 may generally have a curve that is slightly wider than the tool that is used to remove the material.

The foregoing describes some example embodiments of creating a recessed pattern having intricate features in a substrate. Although the foregoing discussion has presented specific embodiments, persons skilled in the art will recognize that changes may be made in form and detail without departing from the spirit and scope of the embodiments. Accordingly, the specific embodiments described herein should be understood as examples and not limiting the scope thereof.

The invention claimed is:

1. A method for creating a pattern in a substrate comprising:
    orienting a laser relative to the substrate;
    laser ablating the substrate to form a recessed geometry in the substrate, wherein the laser ablating includes performing a raster pattern using a laser having a spot diameter of between 20 and 40 microns, and wherein the recessed geometry includes an acute interior cut and forms at least a portion of the pattern;
    after forming the portion of the pattern, machining a remainder of the pattern with a mechanical cutter to provide the recessed geometry with a substantially flat surface; and
    inserting material into the pattern, wherein the insert material is different from the substrate.

2. The method of claim 1 further comprising laser ablating a boundary of the pattern in the substrate.

3. The method of claim 2 wherein the mechanical cutter removes material within the laser ablated boundary.

4. The method of claim 2 wherein the laser ablated boundary comprises a moat.

5. The method of claim 1 wherein the geometry comprises at least one feature smaller than an arc achievable by the mechanical cutter.

6. The method of claim 1 further comprising cutting the insert material with the laser.

7. The method of claim 1, wherein the insert member comprises one of a ceramic member or a metallic member.

8. The method of claim 1, wherein the insert member comprises a stainless steel member.

9. The method of claim 1, wherein the substrate comprises a metal.

10. The method of claim 1, wherein the laser ablating comprises:
    a first pass to ablate a first volume of material in a first plane; and
    a second pass to ablate a second volume in a second plane, the second volume being less than the first volume, resulting in a tapered side wall of the recessed geometry.

11. A method of manufacturing a device housing comprising:
    providing a housing surface;
    laser ablating a moat in the housing surface, wherein the laser ablating includes performing a raster pattern using a laser having a spot diameter of between 20 and 40 microns, and wherein the moat defines a boundary of a pattern in the housing surface and having at least one complex edge geometry; and
    after forming the portion of the pattern, removing a portion of the housing surface located within the moat using a mechanical cutter to create a substantially flat recessed portion in the housing surface in the shape of the pattern.

12. The method of claim 11, wherein the laser ablating the moat comprises:
    a first pass to ablate a first volume of material in a first plane; and
    a second pass to ablate a second volume in a second plane, the second volume being less than the first volume, resulting in a tapered side wall of the moat.

13. The method of claim 11 further comprising:
    cutting an insert member with a laser to the shape of the pattern; and
    inserting the insert member into the recessed portion of the housing surface.

14. The method of claim 13, wherein the insert member comprises a material different from that of the housing surface.

15. The method of claim 13 further comprising adhering the insert member to housing surface using an adhesive.

16. The method of claim 13 further comprising adding transparent material over the insert member to bring the recessed pattern flush with the housing surface.

17. The method of claim 11, wherein the housing surface comprises one of a plastic, glass or metallic material.

18. The method of claim 15, wherein the insert member comprises one of a ceramic or metallic material.

19. The method of claim 11 further comprising operating a laser at wavelengths of approximately 50 micrometers or less.

20. The method of claim 11 further comprising operating a CNC machine to perform the mechanical cutting.

* * * * *